United States Patent
Edl et al.

(10) Patent No.: US 11,028,546 B2
(45) Date of Patent: Jun. 8, 2021

(54) CONCRETE BARRIER-WALL ELEMENT AND METHOD OF PRODUCING

(71) Applicant: KIRCHDORFER FERTIGTEILHOLDING GMBH, Wöllersdorf (AT)

(72) Inventors: Thomas Edl, Müllendorf (AT); Franz Spitzer, Warth (AT)

(73) Assignee: DELTA BLOC INTERNATIONAL GMBH, Wollersdorf-Steinabruckl (AT)

( * ) Notice: Subject to any disclaimer, the term of this patent is extended or adjusted under 35 U.S.C. 154(b) by 0 days.

(21) Appl. No.: 16/467,663

(22) PCT Filed: Nov. 27, 2017

(86) PCT No.: PCT/EP2017/080537
§ 371 (c)(1),
(2) Date: Jun. 7, 2019

(87) PCT Pub. No.: WO2018/104094
PCT Pub. Date: Jun. 14, 2018

(65) Prior Publication Data
US 2020/0087875 A1 Mar. 19, 2020

(30) Foreign Application Priority Data
Dec. 7, 2016 (AT) ............... A 51118/2016

(51) Int. Cl.
*B29C 39/10* (2006.01)
*E01F 15/08* (2006.01)
(Continued)

(52) U.S. Cl.
CPC ............ *E01F 15/083* (2013.01); *B28B 23/02* (2013.01); *B29C 39/10* (2013.01); *E04C 5/0622* (2013.01)

(58) Field of Classification Search
None
See application file for complete search history.

(56) References Cited

U.S. PATENT DOCUMENTS 3,308,724 A * 3/1967 Smith ................. E01F 15/085
404/7
3,678,815 A * 7/1972 Younker ............... E01D 19/103
14/73
(Continued)

FOREIGN PATENT DOCUMENTS

| EP | 1063357 A1 | 12/2000 |
|---|---|---|
| FR | 2862674 A1 | 5/2005 |
| JP | 10008429 | * 1/1998 |

OTHER PUBLICATIONS

International Application No. PCT/EP2017/080537, International Preliminary Report dated Mar. 26, 2019, 24 pages.
(Continued)

*Primary Examiner* — Edmund H Lee
(74) *Attorney, Agent, or Firm* — Liang & Hennessey LLP; Brian Hennessey (57) ABSTRACT

The invention relates to a reinforcing element for a concrete barrier-wall element, which concrete barrier-wall element has a repelling profile on at least one longitudinal side, wherein the reinforcing element has longitudinal reinforcing bars and has bows, which extend transversely to the longitudinal reinforcing bars and are connected to the longitudinal reinforcing bars. According to the invention, the reinforcing element has at least one first region and the first region largely has the repelling profile. The invention further relates to a method for producing a concrete barrier-wall element having a repelling profile on at least one longitudinal side.

20 Claims, 3 Drawing Sheets

(51) Int. Cl.
*B28B 23/02* (2006.01)
*E04C 5/06* (2006.01)

(56) References Cited

U.S. PATENT DOCUMENTS

| | | | | |
|---|---|---|---|---|
| 4,084,928 A | * | 4/1978 | Petersik | B28B 1/084 404/100 |
| 4,423,854 A | * | 1/1984 | Cobb | E01F 15/083 256/13.1 |
| 4,494,892 A | * | 1/1985 | Wojciechowski | E01F 15/083 404/6 |
| 4,605,336 A | * | 8/1986 | Slaw, Sr. | E01D 19/103 404/6 |
| 4,668,462 A | | 5/1987 | Smith | |
| 4,806,044 A | * | 2/1989 | Duckett | E01F 15/006 16/361 |
| 5,651,635 A | * | 7/1997 | Nagle | E01F 15/083 256/13.1 |
| 5,685,665 A | * | 11/1997 | Lembo | E01F 15/025 256/13.1 |
| 6,394,410 B1 | * | 5/2002 | Thompson | E01C 19/4886 249/2 |
| 6,526,721 B1 | * | 3/2003 | Nash | E04B 1/6806 248/302 |
| 6,679,649 B1 | * | 1/2004 | Capolupo | E01F 15/0476 256/13.1 |
| 9,598,827 B1 | * | 3/2017 | Pavloff, Jr. | E01F 15/14 |
| 2018/0334780 A1 | | 11/2018 | Cooper | |

OTHER PUBLICATIONS

Austrian Patent Application No. 51118/2016, Office Action dated Apr. 4, 2017, 3 pages.
Office Action of the Georgian National Intellectual Property Centre in Application No. AP 2017 15104; dated Jul. 24, 2020.

* cited by examiner

CONCRETE BARRIER-WALL ELEMENT AND METHOD OF PRODUCING

CROSS-REFERENCE TO RELATED APPLICATIONS

The present application is a national phase application of PCT Application No. PCT/EP2017/080537, filed Nov. 27, 2017, entitled "REINFORCING ELEMENT", which claims the benefit of Austrian Patent Application No. A 51118/2016, filed Dec. 7, 2016, each of which is incorporated by reference in its entirety.

BACKGROUND OF THE INVENTION

1. Field of the Invention

The invention relates to a reinforcing element for a concrete barrier-wall element, which concrete barrier-wall element has a repelling profile on at least one longitudinal side, wherein the reinforcing element has longitudinal reinforcing bars and has bows, which extend transversely to the longitudinal reinforcing bars and are connected to the longitudinal reinforcing bars.

2. Description of the Related Art

Reinforcing elements are used for concrete barrier-wall elements of a vehicle restraint system. Concrete barrier-wall elements are prefabricated concrete parts which together form a vehicle restraint system that is meant to prevent vehicles from exiting the roadway or crossing into the opposing lane. Concrete barrier-wall elements of this type have a characteristic profile on at least one longitudinal side facing the roadway, which ensures that a vehicle driving against it at an angle does not bounce off, but is deflected in a travelling direction parallel to the longitudinal side.

Concrete barrier-wall elements usually have a reinforcement, which is bound from a plurality of individual elements. In this case, the actual form of the reinforcement depends on the retaining effect of the concrete barrier-wall elements to be achieved, wherein on the other hand it is a goal to use as little reinforcing material as possible for economic reasons.

The reinforcement usually has at least longitudinal reinforcing bars, in order to reduce sagging or prevent the concrete barrier-wall element from breaking through in the event of an impact. The longitudinal reinforcing bars are frequently inserted centrally in this case. Moreover, the longitudinal reinforcing bars are often connected with bows, in order to increase the internal stability. In order to avoid spalling, especially in the head region of the concrete barrier-wall elements, additional filigree reinforcing steel mats are often used.

A concrete barrier-wall element with a bound or welded reinforcement basket is known from U.S. Pat. No. 5,651,635 A. Thereby the bows are arranged completely circulating and bent in such a manner that they form the repelling profile.

A concrete barrier-wall element formed as prefabricated part is known from FR 2 862 674 A1. The reinforcement is achieved by connecting longitudinal bars connected by means of bows, wherein the profile of the reinforcement is formed by two L-shaped bows and one U-shaped bow.

A concrete barrier-wall element with a reinforcement with a U profile is known from EP 1 063 357 A1.

The disadvantage of this is that such reinforcements for concrete barrier-wall elements are very costly and labor-intensive in production. Moreover, variations in the retaining effect of the concrete barrier-wall elements occur due to the bound reinforcement, since errors or deviations in the binding of the individual reinforcement parts can arise, or individual reinforcement parts are shifted during the concrete casting process.

It is therefore an object of the invention to provide a reinforcing element with which the disadvantages mentioned can be avoided, with which a concrete barrier-wall element can be produced with less effort and thereby has a reliably high retaining effect while the process reliability in the production process is increased.

SUMMARY OF THE INVENTION

This is achieved according to the invention by the features of a reinforcing element for a concrete barrier-wall element, in which the longitudinal reinforcing bars and the bows make up a two-dimensional curved grid, and that the reinforcing element is formed substantially like a curved surface.

This provides the advantage that concrete barrier-wall elements can be produced with less effort but higher reliability. In this case, the longitudinal reinforcing bars and bows are already formed in such a way that they have the repelling profile of the concrete barrier-wall element to be produced, so that a very stable reinforcement can be positioned close to the relevant surfaces. As a result, there is no need for a complex construction with filigree reinforcing steel mats at exposed points. A further advantage is that the previous overlaps of the longitudinal reinforcing bars, bows and reinforcing steel mats is reduced to overlapping of the longitudinal reinforcing bars with the bows. Reinforcement layers are thus significantly reduced in these overlapping regions. Moreover, the reinforcing elements can already be prefabricated in large quantities and then delivered to the concrete plants, where the concrete barrier-wall elements are then cast. As a result, a significantly more economic production is possible, but also with narrower production tolerances.

The invention further relates to a concrete barrier-wall element concrete barrier-wall element for a vehicle retention system, which concrete barrier-wall element has a repelling profile on at least one longitudinal side, wherein a reinforcing element as provided herein is arranged close to the surface in the region of the at least one longitudinal side.

The invention further relates to a method for producing a concrete barrier-wall element having a repelling profile on at least one longitudinal side, wherein the repelling profile is a New Jersey profile or a step profile, wherein longitudinal reinforcing bars and bows, which extend transversely to the longitudinal reinforcing bars, are connected together to form a reinforcing element. The reinforcing element has at least one first region, wherein the first region is substantially formed like the repelling profile of the concrete barrier-wall element to be produced. A two-dimensional curved grid is constructed by means of the longitudinal reinforcing bars and the bows, wherein the reinforcing element is formed substantially like a curved surface. At least one of the reinforcing elements is introduced into a casting mold in such a way that the at least one reinforcing element is arranged close to the surface in the region of the at least one longitudinal side in the finished concrete barrier-wall element, wherein the casting mold is cast with concrete to form the concrete barrier-wall element.

It is therefore further an object of the invention to provide a method with which the disadvantages mentioned can be avoided, with which a concrete barrier-wall element can be produced with less effort and thereby has a reliably high retaining effect.

This is achieved according to the invention by the features of the methods of the present invention.

The dependent claims relate to further advantageous embodiments of the invention.

Reference is hereby expressly made to the wording of the patent claims, whereby the claims are incorporated into the description by reference at this point and are deemed as rendered literally.

BRIEF DESCRIPTION OF THE DRAWINGS

The invention is described in detail with reference to the enclosed drawings, in which only preferred embodiments are shown by way of example. Thereby.

DETAILED DESCRIPTION

FIGS. 1 to 5 show at least parts of preferred embodiments of a reinforcing element 1 for a concrete barrier-wall element 3 having a repelling profile on at least one longitudinal side 2. The reinforcing element 1 is provided for use in a concrete barrier-wall element 3, which concrete barrier-wall element 3 has at least one longitudinal side 2 with a repelling profile. The repelling profile is a characteristic profile for a concrete barrier-wall element 3 of vehicle retention systems, which ensures that a vehicle driving against the longitudinal side 2 at an angle does not bounce off, but is deflected in a travelling direction parallel to the longitudinal side 2.

It is intended that the reinforcing element 1 has longitudinal reinforcing bars 4 and has bows 5, which extend transversely to the longitudinal reinforcing bars 4 and are connected, preferably welded, to the longitudinal reinforcing bars 4. The longitudinal reinforcing bars 4 are intended to extend in the longitudinal direction in the concrete barrier-wall element 3. The longitudinal reinforcing bars 4 are connected to each other by means of bows 5. A two-dimensional curved grid is preferably constructed by means of the longitudinal reinforcing bars 4 and the bows 5. The bows 5 can extend in particular perpendicularly to the longitudinal reinforcing bars 4. Only part of the longitudinal reinforcement bars 3 and bows 5 are provided with reference signs in FIGS. 1, 2 and 4.

The reinforcing element 1 preferably consists of the longitudinal reinforcing bars 4 and the bows 5.

Moreover, it is intended that the reinforcing element 1 has at least one first region 6 and the first region 6 largely has the repelling profile. Here, the reinforcing element 1 can consist of only the first region 6, or comprise further areas 7, 9. The first region 6 is substantially formed like the repelling profile of the concrete barrier-wall element 3 to be produced. The first region 6 can be designed in particular substantially like the at least one longitudinal side 2 of the concrete barrier-wall element 3. Thus, the first region 6 of the reinforcing element 1 in the concrete body of the concrete barrier-wall element 3 can substantially be arranged to follow the course of the at least one longitudinal side 2 of the concrete barrier-wall element 3.

This provides the advantage that it is possible to produce concrete barrier-wall elements 3 with less effort but higher reliability. In this case, the longitudinal reinforcing bars 4 and bows 5 are already formed in such a way that at least in some regions they have the repelling profile of the concrete barrier-wall element 3 to be produced, so that a very stable reinforcement can be positioned close to the relevant surfaces. As a result, there is no need for a complex construction with filigree reinforcing steel mats at exposed points. A further advantage is that the previous overlaps of the longitudinal reinforcing bars, bows and reinforcing steel mats is reduced to overlapping of the longitudinal reinforcing bars with the bows. Moreover, the reinforcing elements 1 can be prefabricated in large quantities and then delivered to the concrete plants, where the concrete barrier-wall elements 3 are then cast. As a result, a significantly more economic production is possible, but also with narrower production tolerances.

The longitudinal reinforcing bars 4 can be in particular straight.

The longitudinal reinforcing bars 4 can be made in particular of reinforcing steel.

All longitudinal reinforcing bars 4 of a reinforcing element 1 can be in particular of the same design.

The bows 5 can preferably be designed as reinforcing bars bent at an angle, in particular with a predeterminable radius. The bows can be designed so as to extend in the first region 6 in particular following the repelling profile.

The bows 5 can preferably be made of rigid reinforcing bars.

The bows 5 can be made in particular of reinforcing steel.

All bows 5 of a reinforcing element 1 can be in particular of the same design.

The longitudinal reinforcing bars 4 and the bows 5 can preferably be welded to each other.

Furthermore, a concrete barrier-wall element 3 for a vehicle retention system is provided, which concrete barrier-wall element 3 has the repelling profile on at least one longitudinal side 2, wherein the reinforcing element 1 is arranged close to the surface in the region of the at least one longitudinal side 2. The concrete barrier-wall element 3 has a concrete body which is shown in a transparent manner in FIGS. 1 to 4, in which the reinforcing element 1 or elements are arranged. The arrangement close to the surface can mean, in particular, that the reinforcing element 1 is arranged at a depth of maximum 10 cm to the surface of the concrete body.

The concrete barrier-wall element 3 can have in particular two longitudinal sides 2, two face sides 10, an upper side 8, as well as a base.

At least one of the longitudinal sides 2 has the repelling profile.

Preferably, both longitudinal sides 2 can have the repelling profile, as shown by way of example in the preferred embodiments in FIGS. 1 to 4.

The length of the longitudinal reinforcing bars 4 can correspond in particular largely to the length of the concrete barrier-wall element 3.

The bows can preferably run largely from the base to at least largely the upper side 8.

The concrete barrier-wall element 3 may further be provided with coupling devices arranged on the face sides, not shown in the figures, for coupling a plurality of concrete barrier-wall elements 3 at the face sides. The coupling devices on both face sides 10 can be connected in particular to the reinforcing elements 1 and/or additional tiebacks.

Furthermore, a method is provided for producing the concrete barrier-wall element 3 having a repelling profile on at least one longitudinal side 2, wherein the longitudinal reinforcing bars 4 and the bows 5, which extend transversely to the longitudinal reinforcing bars 4, are connected together to form the reinforcing element 1, which reinforcing element 1 has at least the one first region 6 and the first region 6 largely has the repelling profile, wherein at least one of the reinforcing elements 1 is introduced into a casting mold in such a way that the at least one reinforcing element 1 is arranged close to the surface in the region of the at least one longitudinal side 2 in the finished concrete barrier-wall element 3, wherein the casting mold is cast with concrete to form the concrete barrier-wall element 3.

The longitudinal reinforcing bars 4 and the bows 5 are preferably connected by welding.

In particular, the longitudinal reinforcing bars 4 and the bows 5 can be welded to each other, and the bows 5 can then be bent into the form of the repelling profile.

Alternatively, the bows 5 can be first bent and then welded to the longitudinal reinforcing bars 4.

It can preferably be provided that the reinforcing elements 1 are produced at least partially, preferably completely, by machine. In particular, bending of the bows 5 and welding can take place in a plant. Alternatively, the reinforcing elements 1 can be implemented in a combination of machine and hand welding.

It is especially preferred to provide that the repelling profile is a New Jersey profile or a step profile. In the preferred embodiments in FIGS. 1 to 4, the repelling profile is the New Jersey profile. In the vicinity of the base, the New Jersey profile has a run-on surface which passes into a steeper repelling surface. The New Jersey profile is a repelling profile which is very frequently used in concrete barrier-wall elements 3. The step profile has two regions which run parallel to one another and are offset relative to one another by a small step. In the first region 6, in particular, the bows 5 can be designed following the course of the New Jersey profile or the step profile.

It is preferably possible to provide that the longitudinal reinforcing bars 4 have a different diameter than the bows 5. In particular, it is possible to provide that all longitudinal reinforcing bars 4 have a first diameter, that all bows 5 have a second diameter, and that the first diameter is not equal to the second diameter. In this case, the first diameter and the second diameter can be selected such that the diameters are adapted to the retention requirements and the weakening at the bending points on the bows 5 can be compensated.

It is also possible to provide that a distance between the bows 5 is variable with respect to one another, and in particular is smaller in a region of the ends of the longitudinal reinforcing bars 4 than in a central region of the longitudinal reinforcing bars 4. This way, more reinforcing material is arranged in the vicinity of the face sides 10, where the danger of damage and spalling is higher.

In particular, it is possible to provide that a distance between the longitudinal reinforcing bars 4 is variable with respect to one another, and in particular is smaller in edge regions of the repelling profile than in a central region of the repelling profile. This way, more reinforcing material is arranged in the vicinity of the upper side 8 arranged at the edges of the repelling profile as well as the base, where the danger of damage and spalling is higher.

It is also possible to provide that a distance between the longitudinal reinforcing bars 4 is smaller with respect to one another in a region of the ends of the bows 5 than in a central region of the bows 5. This way, it is possible to achieve a stronger reinforcement at the free ends of the bows, where loads may be greater.

It is also possible to provide that a distance between the longitudinal reinforcing bars 4 is variable with respect to one another, and in particular is smaller at the edges of the first region 6 than in the middle of the first region 6. This way, there is more reinforcing material in the vicinity of the base and the upper side 8, where the danger of damage and spalling is higher.

Figure 1:
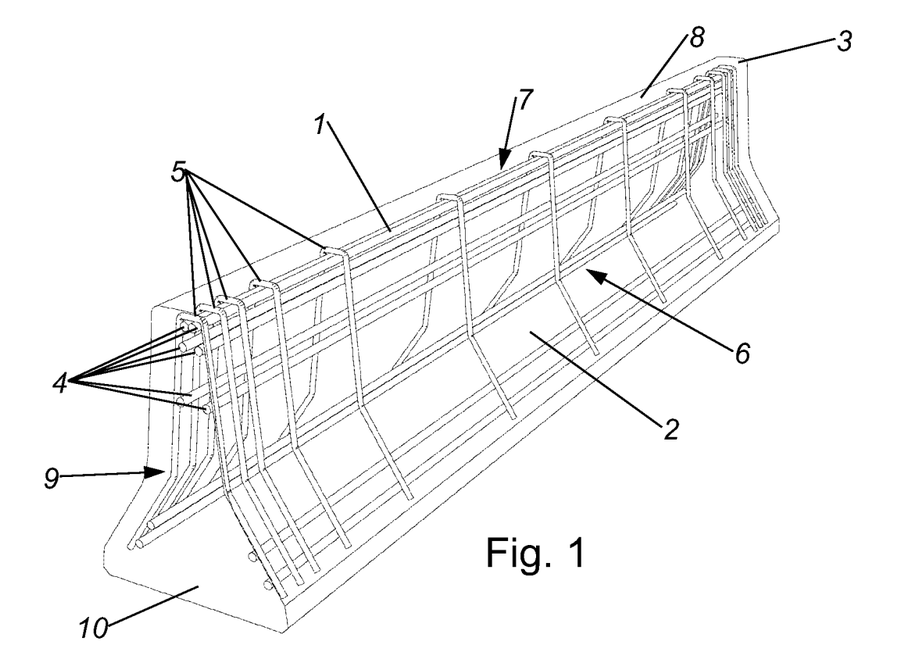
FIG. 1 shows a concrete barrier-wall element with a first preferred embodiment of the reinforcing elements in an axonometric representation.
Figure 2:
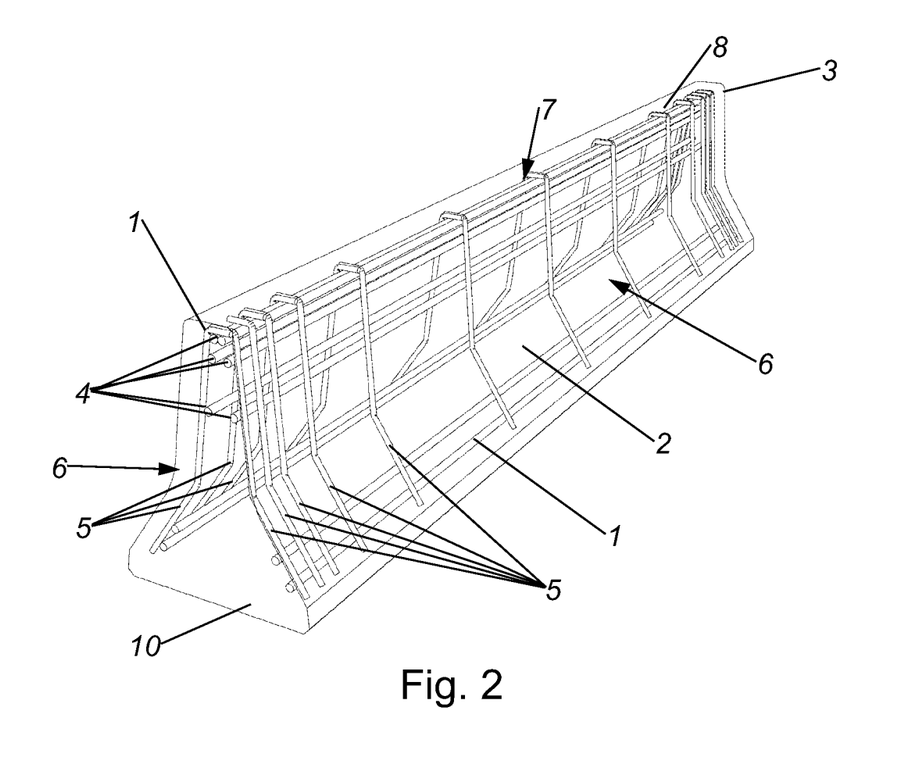
FIG. 2 shows a concrete barrier-wall element with a second preferred embodiment of the reinforcing elements in an axonometric representation.
Figure 3:
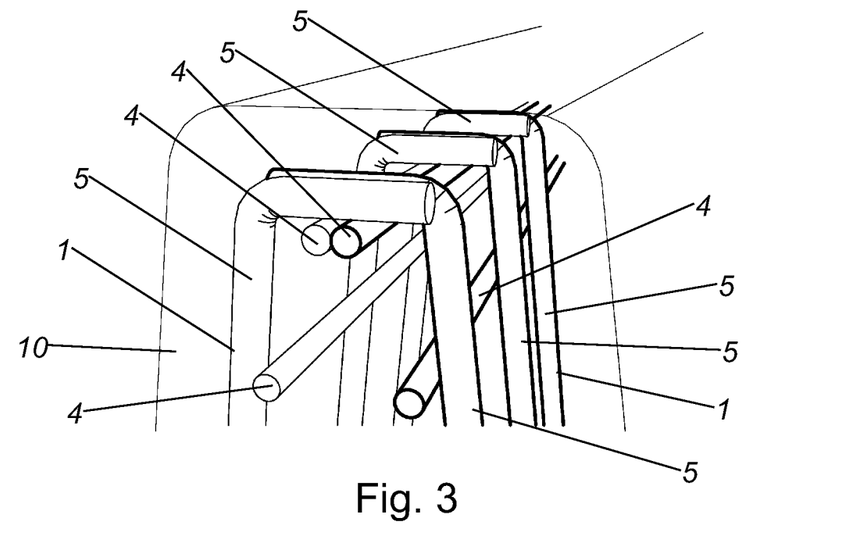
FIG. 3 shows a detail of FIG. 2.
Figure 4:
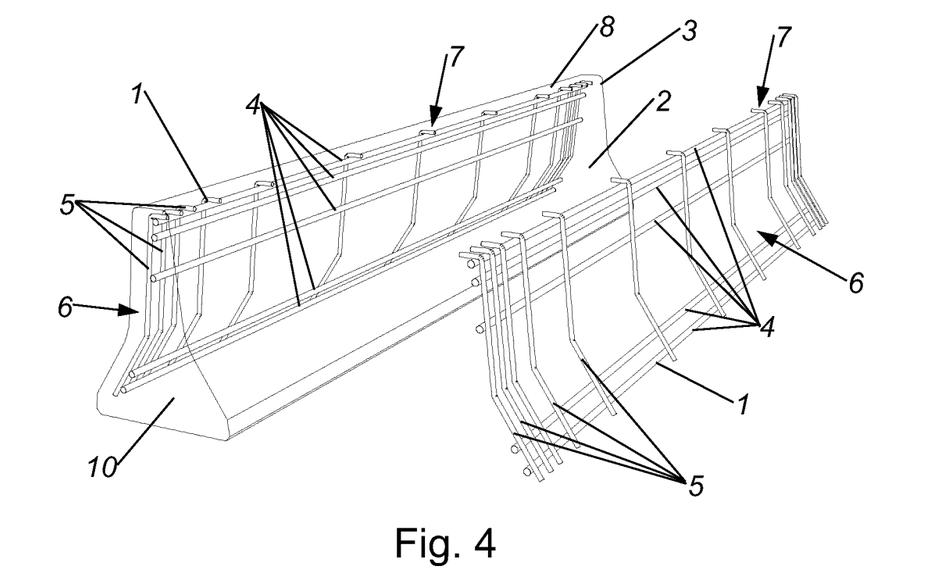
FIG. 4 shows the concrete barrier-wall element of FIG. 2 as an exploded view.
Figure 5:
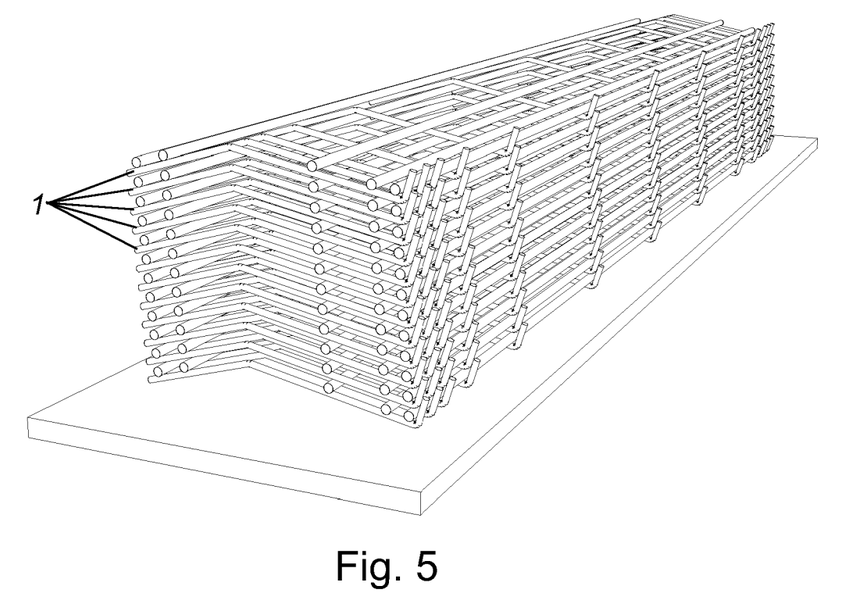
FIG. 5 shows a stack of reinforcing elements of the second preferred embodiment in an axonometric representation.

It is preferably possible to provide that the reinforcing element 1 is flat. In this case, the reinforcing element 1 can be formed substantially like a curved surface. The advantage of this is that the reinforcing elements 1 can be stacked easily and thus transported in a space-saving manner. A stack of reinforcing elements 1 of the second preferred embodiment is shown in FIG. 5 by way of example.

It is possible to provide that the reinforcement of the concrete barrier-wall element 3 formed by at least one reinforcing element 1 is open at the face side 10.

It is possible to provide that the reinforcing element 1 consists only of the first region 6.

It is also possible to provide that a second region 7 adjoins the first region 6, that the second region 7 is angled relative to the first region 6 and is provided to be arranged on an upper side 8 of the concrete barrier-wall element 3. The second region 7 can extend over at least half the width of the upper side 8. This way, the upper side 8 can also be reinforced.

In particular, it is possible to provide that a third region 9 adjoins the second region 7 on a side of the second region 7 facing away from the first region 6, and that the third region 9 largely has the repelling profile. In this case, the first region 6, the second region 7 and the third region 9 substantially form the profile of the two longitudinal sides 2 together with the upper side 8 of the concrete barrier-wall element 3 to be produced. It is possible, in the case of the concrete barrier-wall element 3, to provide that the concrete barrier-wall element 3 has two longitudinal sides 2 having a repelling profile, and that a single reinforcing element 1 is arranged on both longitudinal sides 2. In particular, it is possible to provide that the concrete barrier-wall element 3 has only a single reinforcing element 1. This way, it is possible to achieve a reinforcement of all exposed surfaces of a concrete barrier-wall element 3 by substantially a single prefabricated reinforcing element 1. A concrete barrier-wall element 3 of this type is shown by way of example in FIG. 1.

Alternatively, it is possible, in the case of a reinforcing element 1 made up of a plurality of regions 6,7, to provide that only the first region 6 has the repelling profile.

It is preferably possible to provide that the reinforcing element 1 has only the first region 6 and the second region 7.

In particular, it is possible to provide that the concrete barrier-wall element 3 has two longitudinal sides 2 having a repelling profile, and that one reinforcing element 1 each is arranged on both longitudinal sides 2.

In this case, the concrete barrier-wall element 3 can preferably have two, in particular largely equally formed reinforcing elements 1, wherein it is especially preferred that one of the reinforcing elements 1 each is arranged on one of the longitudinal sides 2. This multi-part construction of the reinforcement makes it possible to simplify the handling of the reinforcing elements 1. Furthermore, the stackability is improved. In addition, reinforcing elements 1 of this type can also be used in the case of a concrete barrier-wall element 3 having only one longitudinal side 2 with the repelling profile. Reinforcing elements 1 formed in this way are shown by way of example in FIGS. 2 to 5, wherein in FIG. 2 both reinforcing elements 1 are shown joined together, while in FIG. 4 one reinforcing element 1 is shown inside the concrete body and the other reinforcing element 1 outside the concrete body.

It is preferably possible to provide that the two reinforcing elements 1 adjoin one another, in particular overlap in the region of an upper side 8 of the concrete barrier-wall element 3. This way, the two reinforcement elements 1 can be connected to each other in a simple manner in the region of the upper side 8. In this case, the bows 5 of the two reinforcing elements 1 can be set off slightly in relation to one another in such a way that they are arranged next to each other in the second region 7.

The invention claimed is:

1. A concrete barrier-wall element having a combined reinforcing element, the concrete barrier-wall element having a repelling profile on at least one longitudinal side opposite longitudinal sides, wherein the repelling profile is a New Jersey profile or a step profile, the combined reinforcing element comprising:
   longitudinal reinforcing bars; and
   bows extending transversely to the longitudinal reinforcing bars and connecting to the longitudinal reinforcing bars;
   wherein the reinforcing element has at least a first region, the first region being formed substantially similar to the repelling profile of the concrete barrier-wall element;
   wherein the longitudinal reinforcing bars and the bows make up a two-dimensional curved grid, and the reinforcing element is formed substantially as a curved surface;
   wherein, on an upper side, the reinforcing element connects to another reinforcing element having another repelling profile to form the combined reinforcing element, the repelling profile of the reinforcing element facing away from the other repelling profile of the other reinforcing element;
   wherein the combined reinforcing element is introduced into a casting mold; and
   wherein the casting mold is cast with concrete to form the concrete barrier-wall element.

2. The concrete barrier-wall element according to claim 1, wherein a distance between the bows is variable with respect to one another.

3. The concrete barrier-wall element according to claim 1, wherein a distance between the longitudinal reinforcing bars is variable with respect to one another.

4. The concrete barrier-wall element according to claim 1, wherein a distance between the longitudinal reinforcing bars is smaller with respect to one another in a region of the ends of the bows than in a central region of the bows.

5. The concrete barrier-wall element according to claim 1, wherein the longitudinal reinforcing bars have a different diameter than the bows.

6. The concrete barrier-wall element according to claim 1, wherein a second region adjoins the first region, and the second region is angled relative to the first region and is arranged on an upper side of the concrete barrier-wall element.

7. The concrete barrier-wall element according to claim 6, wherein the reinforcing element has only the first region and the second region.

8. The concrete barrier-wall element according to claim 6, wherein a third region adjoins the second region on a side of the second region facing away from the first region, and the third region largely has the repelling profile.

9. The concrete A concrete barrier-wall element according to claim 1, wherein the reinforcing element is arranged close to the surface in the region of the at least one longitudinal side.

10. The concrete barrier-wall element according to claim 9, wherein the reinforcing element and the other reinforcing element overlap in the region of an upper side of the concrete barrier-wall element.

11. The concrete barrier-wall element according to claim 9, wherein the concrete barrier-wall element has two longitudinal sides having a repelling profile, and a single reinforcing element is arranged on both longitudinal sides.

12. The concrete barrier-wall element according to claim 1, wherein, on the upper side, the bows from the reinforcing element are offset from and overlap other bows from the other reinforcing element.

13. The concrete barrier-wall element according to claim 12, wherein, on the upper side, the bows from the reinforcing element are connected to the other bows from the other reinforcing element.

14. A method for producing a concrete barrier-wall element having a repelling profile on two longitudinal sides, the repelling profile being a New Jersey profile or a step profile, the method comprising:
   connecting together longitudinal reinforcing bars and bows, the bows extending transversely to the longitudinal reinforcing bars, to form a reinforcing element, the reinforcing element having at least one first region, the first region being substantially formed substantially similar to the repelling profile of the concrete barrier-wall element to be produced, wherein a two-dimensional curved grid is constructed by means of the longitudinal reinforcing bars and the bows, and wherein the reinforcing element is formed substantially as a curved surface;
   connecting the reinforcing element and another reinforcing element on an upper side to form a combined reinforcing element, another repelling profile of the other reinforcing element facing away from the repelling profile of the reinforcing element in the combined reinforcing element;
   introducing into a casting mold the combined reinforcing element in such a way that the combined reinforcing element is arranged close to the surface in the region of the two longitudinal sides in the concrete barrier-wall element; and
   casting the casting mold with concrete while the combined reinforcing element is in the casting mold to form the concrete barrier-wall element.

15. The method according to claim 14, wherein the reinforcing elements are machine-made.

16. The method according to claim 14, wherein, on the upper side, the bows from the reinforcing element are offset from and overlap other bows from the other reinforcing element.

17. The method according to claim 16, wherein, on the upper side, the bows from the reinforcing element are connected to the other bows from the other reinforcing element.

18. A concrete barrier-wall element, the concrete barrier-wall element having first and second repelling profiles on two longitudinal sides facing away from each other, the concrete barrier-wall element comprising:
- a first reinforcing element including first longitudinal reinforcing bars and first bows extending transversely to the first longitudinal reinforcing bars and connecting to the first longitudinal reinforcing bars, the first longitudinal reinforcing bars and the first bows forming the first repelling profile of the concrete barrier-wall; and
- a second reinforcing element including second longitudinal reinforcing bars and second bows extending transversely to the second longitudinal reinforcing bars and connecting to the second longitudinal reinforcing bars, the second longitudinal reinforcing bars and the second bows forming the second repelling profile of the concrete barrier-wall;
- wherein the first reinforcing element and the second reinforcing element are connected on an upper side to form a combined reinforcing element;
- wherein the combined reinforcing element is introduced into a casting mold; and
- wherein the casting mold is cast with concrete to form the concrete barrier-wall element.

19. The concrete barrier-wall element according to claim 18, wherein:
- the first bows connect to at least one of the second longitudinal reinforcing bars; and
- the second bows connect to at least one of the first longitudinal reinforcing bars.

20. The concrete barrier-wall element according to claim 19, wherein:
- the first bows overlap the second bows; and
- the first bows are offset from the second bows.

* * * * *

UNITED STATES PATENT AND TRADEMARK OFFICE
CERTIFICATE OF CORRECTION

| | |
|---|---|
| PATENT NO. | : 11,028,546 B2 |
| APPLICATION NO. | : 16/467663 |
| DATED | : June 8, 2021 |
| INVENTOR(S) | : Thomas Edl and Franz Spitzer |

It is certified that error appears in the above-identified patent and that said Letters Patent is hereby corrected as shown below:

In the Claims

On Column 7, Line 25, Claim 1, please delete "at least one longitudinal side".

Signed and Sealed this
Fourth Day of July, 2023

*Katherine Kelly Vidal*

Katherine Kelly Vidal
*Director of the United States Patent and Trademark Office*